(12) United States Patent
Lehto

(10) Patent No.: US 6,389,847 B1
(45) Date of Patent: May 21, 2002

(54) AIR OUTPUT UNIT IN CONNECTION WITH A TEMPERING STATION FOR GLASS PANELS, AND METHOD FOR MANUFACTURING THE SAME

(75) Inventor: Markku Lehto, Tampere (FI)

(73) Assignee: Tamglass Ltd. Oy, Tampere (FI)

( * ) Notice: Subject to any disclaimer, the term of this patent is extended or adjusted under 35 U.S.C. 154(b) by 52 days.

(21) Appl. No.: 09/588,601

(22) Filed: Jun. 7, 2000

(30) Foreign Application Priority Data

Jun. 7, 1999 (FI) .................................................. 991293

(51) Int. Cl.[7] ............................................. C03B 27/00
(52) U.S. Cl. ............................... 65/348; 65/95; 65/114; 65/351; 65/355; 415/108; 415/213.1; 415/126; 126/105 A; 126/114; 126/110 A
(58) Field of Search ............................. 65/95, 114, 348, 65/351, 355; 415/108, 213.1, 126; 126/105 A, 114, 110 A

(56) References Cited

U.S. PATENT DOCUMENTS 2,266,917 A * 12/1941 Strauch
4,735,646 A * 4/1988 Aratani et al. ................. 65/114
5,647,882 A * 7/1997 Thiessen ....................... 65/114

FOREIGN PATENT DOCUMENTS

EP 267560 11/1987

* cited by examiner

Primary Examiner—Michael Colaianni
(74) Attorney, Agent, or Firm—Burns, Doane, Swecker & Mathis, L.L.P.

(57) ABSTRACT

The invention relates to an air output unit in connection with a tempering station in a tempering plant for glass panels, and to a method for manufacturing the unit. An equipment bay (3) has its walls (32), roof (33), and floor (31) designed and dimensioned as a shipping container, wherein air output equipment (4) is set up and secured prior to shipping to a working site. Since the fan room enclosing an air output unit functions at the same time as a shipping container for the air output unit, the repeated loading and unloading of air output equipment is avoided. The workload required for shipping and assembling is substantially reduced.

18 Claims, 3 Drawing Sheets

AIR OUTPUT UNIT IN CONNECTION WITH A TEMPERING STATION FOR GLASS PANELS, AND METHOD FOR MANUFACTURING THE SAME This application claims priority under 35 U.S.C. §§ 119 and/or 365 to 991293 filed in Finland on Jun. 7, 1999; the entire content of which is hereby incorporated by reference.

The invention relates to an air output unit in connection with a tempering station in a tempering plant or facility for glass panels, comprising air output equipment which typically includes two fans and possibly a compressor with its compressed-air tank, as well as walls, a roof, and a floor enclosing the air output unit and constituting an equipment bay or a fan room for the air output unit, the air output equipment being isolated from its ambience when accommodated therein.

The invention relates also to a method for manufacturing an air output unit in connection with a tempering station in a tempering plant for glass panels, said method comprising the accommodation, installation, and mounting of air output equipment, including typically two fans and possibly a compressor with its compressed-air tank, in an equipment bay for the air output unit, which is enclosed by walls, a roof, and a floor for the air output unit.

FIG. 1 of the accompanying drawing depicts a typical prior art, including fans 4 installed in a fan room 3 which is built alongside a tempering plant. The tempering plant comprises a heating furnace 1 for glass panels, and a tempering station 2 for blasting tempering air to the opposite surfaces of a glass panel for high-speed chilling.

The fan rooms in connection with prior art tempering plants are immobile buildings or structures which are set up by whoever has ordered the plant.

The shipping of air output equipment, such as fans and compressor equipment, is handled as container transport, the equipment being loaded in shipping containers and, after the haul, being unloaded from the shipping containers and being placed and set up in a fan room. A separate fan room is necessary e.g. for the reasons of sound insulation.

It is an object of the invention to provide an improved air output unit, wherein the air output equipment and the fan room are integrated in a novel fashion for a substantial reduction of workload involved in shipping and installation and, on the other hand, for easier layout revisions at the working site.

This object will be achieved by means of an air output unit of the invention on the basis of the characterizing features set forth in the annexed claim 1. The object will be respectively achieved by means of a method of claim 9 for manufacturing an air output unit.

The invention will now be described in more detail with reference to the accompanying drawings, in which FIG. 1 depicts a typical prior art, FIG. 2 shows an air output unit of the invention in a side view, the side wall being removed;

Figure 1:
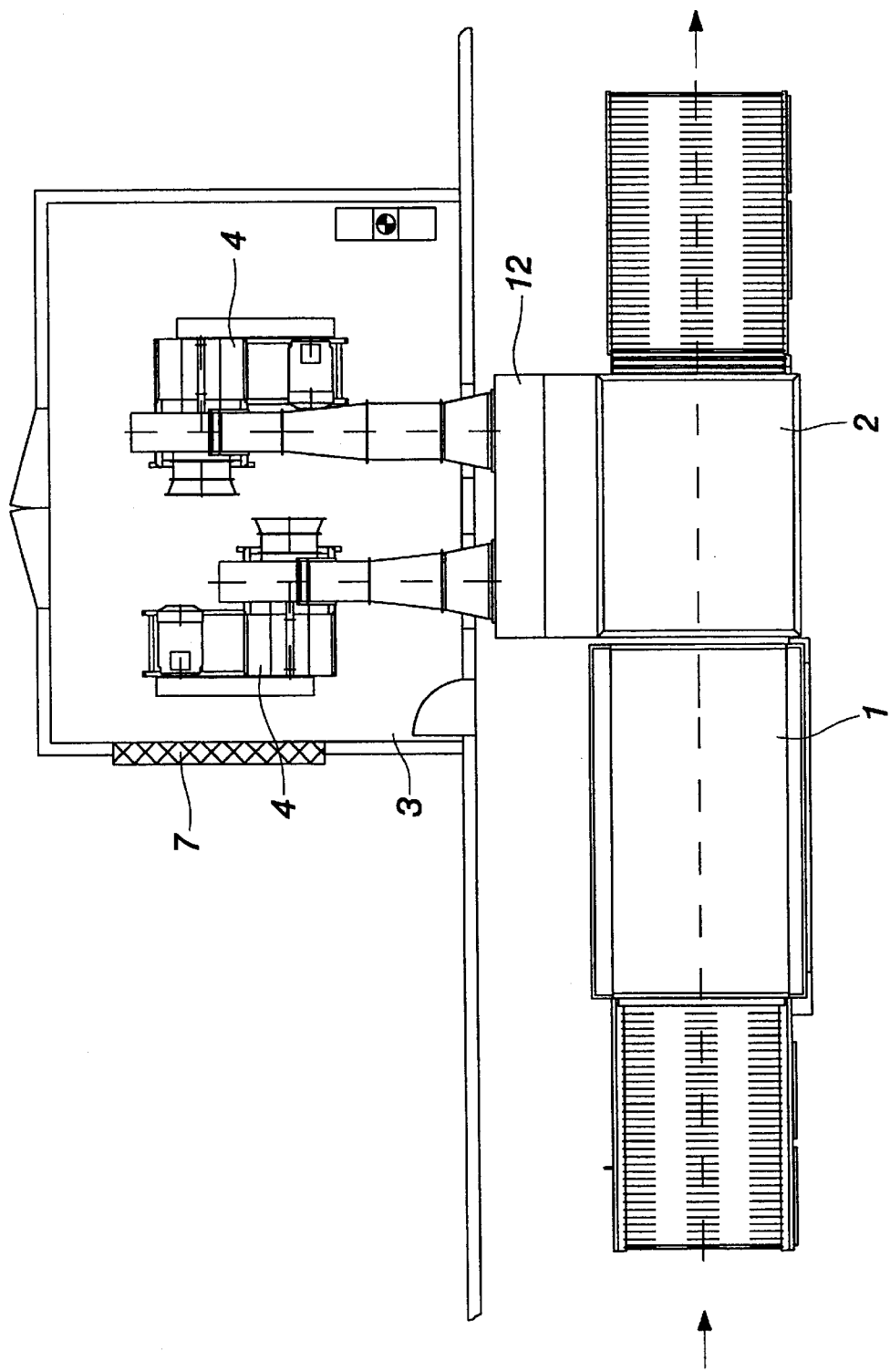

In the case of FIG. 1, an immobile fan room 3 has been built in a conventional fashion alongside a tempering plant. In the illustrated case, the tempering plant comprises a heating furnace 1 and a tempering station 2. Naturally, the furnace 1 and/or the tempering station 2 may also consist of several successive stations. Since cooling air must be delivered to both sides of a glass panel, there are typically two fans 4 in service, which by way of distributing boxes 12 are in communication with nozzle boxes of the tempering station 2. The fan room 3 has its wall provided with an air intake 7.

Figure 2:
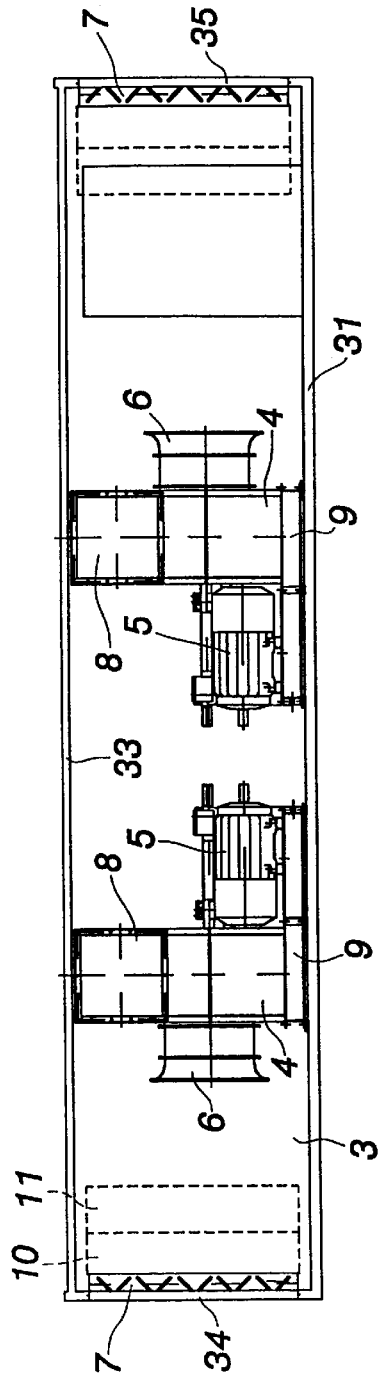
Figure 3:
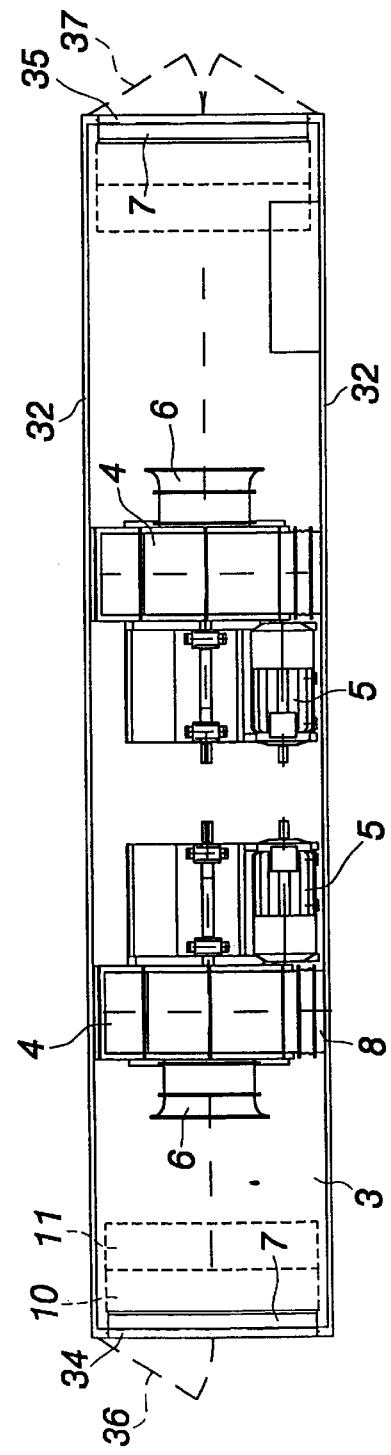
FIG. 3 shows the same air output unit in a plan view, the roof being removed.
Figure 4:
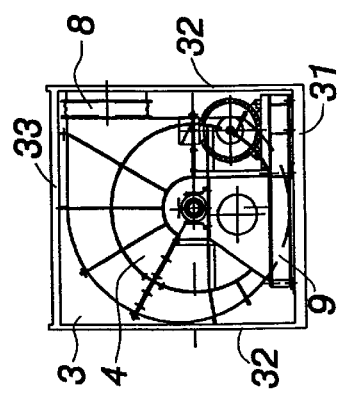
FIG. 4 shows the same air output unit in an end view, the end wall being removed.

FIGS. 2–4 show a fan room 3 of the invention, which is constructed and dimensioned as a standard-size shipping container. The container like this has a width less than 2.5 m and a length of 6 m (20 feet) or 12 m (40 feet).

The container has side walls 32, a roof 33, and a floor 31, whose structural designs and material selections can be made by using solutions known from shipping or transport containers. One end wall 34 can be provided with a service door 36, and the other end wall 35 may be entirely constituted by double doors 37, the opened position of which allows the air output equipment to be placed inside the container.

In the presently described case, there are two fans 4 set side by side, such that air intakes 6 are directed away from each other. The container ends 34, 35 are provided with an air intake louvre 7 fitted with a gate valve. At the working site, the doors 36, 37 are kept open or removed. During shipping, the doors are necessary for closing the container. Behind the louvre 7 inside the container may be a sound absorption element 10 and a filter 11 for aspirating blast air therethrough. The fan 4 and a drive motor 5 therefor are set on a mounting tray 9, which is secured with bolts or screws to the container floor 31. The fan units can be pre-assembled on the tray 9 therefor, which is pushed inside a container and secured in place. The air output equipment is assembled and set already in the factory in proper positions and stand-by state. Blast air outlets 8 are located at a predetermined distance from each other in order to connect the same by means of suitable connecting pipes with an air distributing box 12 of the tempering plant. The outlets 8 are adapted to be closed for shipping.

Figure 5:
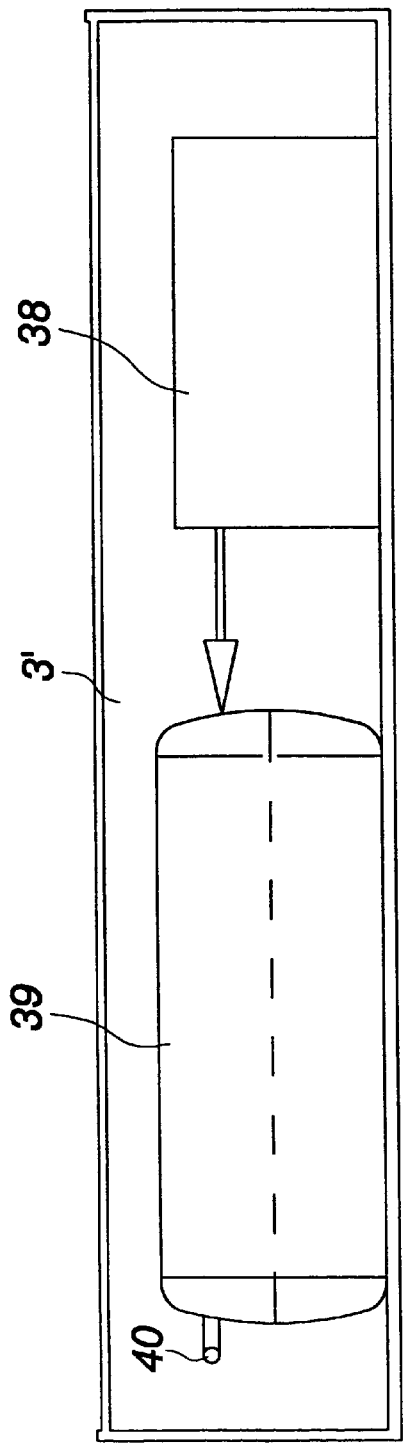
FIG. 5 shows an optional accessory unit for producing compressed air in addition to blast air.
Figure 6:
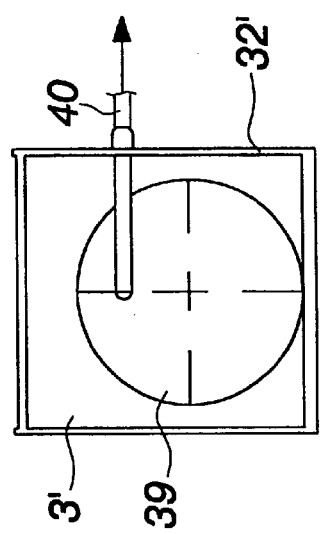
FIG. 6 shows the accessory unit of FIG. 5 in an end view.

FIGS. 5 and 6 illustrate an optional accessory, which is assembled in a separate container 3'. In some applications, the air output equipment includes also a compressor 38 with its compressed-air tank 39. The compressed-air tank 39 is connected by means of a compressed-air pipe 40 through a wall 32' of the container 3' with the distributing box 12 visible in FIG. 1. This is just one possible design, since e.g. the compressor 38 can be accommodated in the same container 3 as the fans 4, and the tank 39 may be separately outside the container.

Setting up the air output equipment beforehand at the factory within a container, which is mobile, affords the following benefits:

shipping is easier as a completed unit, since loading and unloading are not necessary. When set up alongside a tempering plant, the equipment is ready to work.

if the layout of a tempering plant changes, e.g. a tempering machine is relocated, it is easy to follow up with the air output unit without having to disassemble and build indoor facilities and a fan room a narrow and long fan room is compact and easy to locate either outdoors or indoors, even on top of a tempering machine the layout and design of an entire facility becomes easier and the installation time is cut down.

The invention is not limited to the above exemplary embodiment. For example, the air intake louvres 7 can be included in the walls 32, in addition to or instead of the end louvres. Two fans 4 can be replaced with just a single fan.

What is claimed is:

1. An air output unit in combination with a tempering station in a tempering plant for glass panels, the air output unit comprising air output equipment positioned in a transportable container, the air output equipment including at least one fan and the container including walls, a roof, and a floor enclosing the air output equipment and constituting an equipment bay for the air output equipment, the air output equipment being isolated from its ambience as accommodated in the equipment bay, the air output equipment being set up in the equipment bay and secured prior to transporting to a working site.

2. The combination as set forth in claim 1, wherein the container has a width less than 2.5 m and a length of about 6.0 m or more.

3. The combination as set forth in claim 1, wherein at least one of the walls of the container is provided with an openable and closeable aperture which is in flow communication with a pressure port of the fan and constitutes an outlet for blast air.

4. The combination as set forth in claim 3, wherein the container is provided with two fans and two outlets for blast air.

5. The combination as set forth in claim 1, wherein the fan and a drive motor for the fan are fastened to a mounting tray which is secured to the floor of the container with bolts or screws.

6. The combination as set forth in claim 1, including a compressor and a compressed-air tank placed in a different container than the fan.

7. The combination as set forth in claim 1, including a compressor placed in the container and a compressed-air tank located outside the container.

8. The combination as set forth in claim 1, wherein the walls of the container are provided with air intake louvres, and including a sound absorption element and a filter located behind the intake louvres and within the container.

9. A method for manufacturing and installing an air output unit in connection with a tempering station in a tempering plant for glass panels, said method comprising accommodating, installing and mounting air output equipment, including at least one fan, in an equipment bay enclosed by walls, a roof, and a floor, said walls, roof, and floor defining the equipment bay being dimensioned and designed as a transportable container, in which the air output equipment is set up and secured prior to transporting to a working site, and operatively connecting the air output unit to the tempering station of the tempering plant.

10. A method as set forth in claim 9, wherein the air output equipment is set up in a standby state at a factory prior to transporting to the working site.

11. An air output unit in combination with a tempering station in a tempering plant for glass panels, the air output unit comprising a plurality of walls, a roof and a floor which together define an enclosed transportable container, and at least one fan secured in place within the container and communicating with a nozzle box of the tempering station, said at least one fan being surrounded by the walls, roof and floor of the container so as to be isolated from ambience.

12. The combination as set forth in claim 11, wherein the container has a width less than 2.5 m and a length of about 6.0 m or more.

13. The combination as set forth in claim 11, wherein at least one of the walls of the container is provided with an openable and closable aperture in flow communication with a pressure port of the fan and constituting an outlet for blast air.

14. The combination as set forth in claim 13, wherein the at least one fan includes two fans located within and secured to the container.

15. The combination as set forth in claim 11, wherein the fan and a drive motor for the fan are fastened to a mounting tray secured to the floor of the container with a connector.

16. The combination as set forth in claim 11, including a compressor and a compressed-air tank placed in a different container than the at least one fan.

17. The combination as set forth in claim 11, including a compressed-air tank located outside the container.

18. The combination as set forth in claim 11, wherein the walls of the container are provided with air intake louvres, and including a sound absorption element and a filter located behind the intake louvres and within the container.

* * * * *